United States Patent
Zhuang et al.

(10) Patent No.: US 11,431,919 B1
(45) Date of Patent: Aug. 30, 2022

(54) SYSTEM AND METHOD FOR DETECTING FLICKER FREQUENCY, AND ELECTRONIC DEVICE COMPRISING THE SYSTEM

(71) Applicant: LITE-ON SINGAPORE PTE. LTD., Singapore (SG)

(72) Inventors: Cai-Xin Zhuang, Singapore (SG); Ke-Er Cui, Singapore (SG)

(73) Assignee: LITE-ON SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 17/327,776

(22) Filed: May 24, 2021

(51) Int. Cl.
*H04N 5/235* (2006.01)

(52) U.S. Cl.
CPC ......... *H04N 5/2357* (2013.01); *H04N 5/2353* (2013.01)

(58) Field of Classification Search
CPC ............................ H04N 5/2357; H04N 5/2353
See application file for complete search history.

(56) References Cited

U.S. PATENT DOCUMENTS 8,284,299 B2 * 10/2012 Tanaka ................ H04N 5/2353
  348/362
9,912,886 B2 * 3/2018 Shigeta .............. H04N 5/35581

* cited by examiner

*Primary Examiner* — Twyler L Haskins
*Assistant Examiner* — Angel L Garces-Rivera
(74) *Attorney, Agent, or Firm* — Li & Cai Intellectual Property Office

(57) ABSTRACT

A system and method for detecting a flicker frequency, and electronic device including the system are provided. The system includes an optical sensor, a sequence generator, a first and a second computing circuit. The optical sensor converts an incident light into a digital sequence according to a sampling frequency, which is greater than at least twice the flicker frequency. The sequence generator generates a first reference sequence and a second reference sequence that is delayed by a period from the first reference sequence, which are periodic according to the flicker frequency and the sampling frequency. The first computing circuit computes a first and a second correlation coefficient. The second computing circuit computes a detection score that indicates a probability of existence of the flicker frequency according to the first and the second correlation coefficient.

16 Claims, 9 Drawing Sheets

SYSTEM AND METHOD FOR DETECTING FLICKER FREQUENCY, AND ELECTRONIC DEVICE COMPRISING THE SYSTEM

FIELD OF THE DISCLOSURE

The present disclosure relates to a system and a method for detection, and more particularly to a system and a method for detecting a flicker frequency.

BACKGROUND OF THE DISCLOSURE

In an indoor environment, ambient lights can flicker. For example, since a common fluorescent lamp has an alternating current frequency between 50 Hz and 60 Hz, it is likely to have a flicker frequency between 100 Hz and 120 Hz. Under such lighting condition, when capturing images or videos by with a camera, banding artifacts are likely to be formed because of a rolling shutter mechanism of the camera. Therefore, a way of detecting a flicker frequency is usually applied to eliminate the banding artifacts. The camera is able to be automatically and properly adjusted through determining the flicker frequency, for example, adjusting the exposure/integration time to an integer multiple of a light source period, so as to minimize the banding artifacts.

However, the above-mentioned way for detecting a flicker frequency usually analyzes image data for a frame or a plurality of frames, which requires a larger memory for image data storage and a high-performance computing unit for processing a great amount of data, especially for high resolution cameras, thereby causing an increase of power consumption, computing delay and the cost of larger silicon area.

SUMMARY OF THE DISCLOSURE

In response to the above-referenced technical inadequacies, the present disclosure provides a system and a method for detecting a flicker frequency, which has a low requirement of memory, a low computing complexity, and a higher detection precision, such that the system and the method can be effectively implemented in hardware and low energy consumption integrated circuits.

In one aspect, the present disclosure provides a method for detecting a flicker frequency, the method including: utilizing an optical sensor to convert an incident light into a digital sequence according to a sampling frequency, the sampling frequency being greater than at least twice the flicker frequency; generating a first reference sequence and a second reference sequence that are periodic according to the flicker frequency and the sampling frequency, the second reference sequence being a sequence delayed by a period from the first reference sequence; computing a first correlation coefficient between the digital sequence and the first reference sequence, and computing a second correlation coefficient between the digital sequence and the second reference sequence; and computing a detection score that indicates a probability of existence of the flicker frequency according to the first correlation coefficient and the second correlation coefficient.

In another aspect, the present disclosure provides a system for detecting a flicker frequency according to the above-mentioned method.

In yet another aspect, the present disclosure provides an electronic device including the above-mentioned system.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
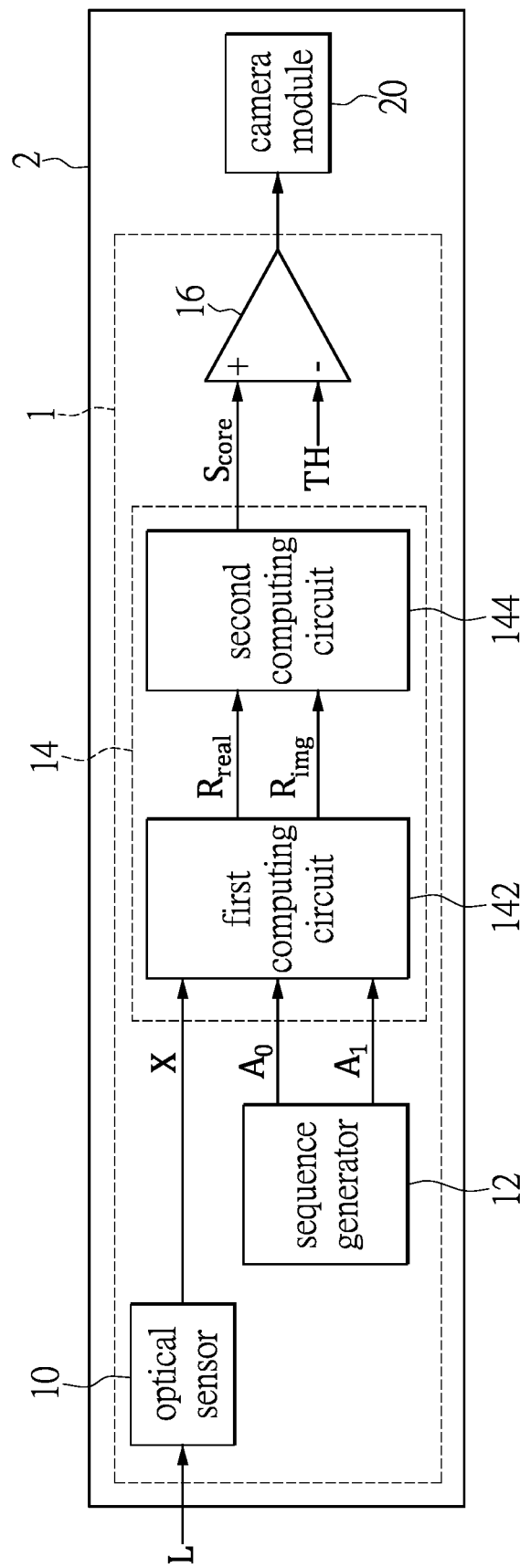
FIG. 1 is a block diagram of a system for detecting a flicker frequency according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

It should be noted that a system and a method for detecting a flicker frequency provided by one embodiment of the present disclosure can be applied to any electronic device. Referring to FIG. 1, FIG. 1 is a block diagram of the system for detecting the flicker frequency according to one embodiment of the present disclosure. As shown in FIG. 1, a system 1 for detecting a flicker frequency $F_{bin}$ includes an optical sensor 10, a sequence generator 12, and a computing circuit 14. The optical sensor 10, the sequence generator 12, and the computing circuit 14 can be implemented through only hardware, or implemented through hardware in cooperation with firmware or software. In addition, the optical sensor 10, the sequence generator 12, and the computing circuit 14 may be integrated or separately arranged. In short, the present disclosure is not limited to a specific implementation.

In this embodiment, the computing circuit 14 is coupled to the optical sensor 10 and the sequence generator 12, and the computing circuit 14 is divided into a first computing circuit 142 and a second computing circuit 144 according to functions. The optical sensor 10 converts an incident light L into a digital sequence X according to a sampling frequency $F_s$, and the sampling frequency $F_s$ is greater than at least twice the flicker frequency $F_{bin}$. In practice, the optical sensor 10 can be an ambient optical sensor, and the output digital sequence X is a series of digital codes that serves as an input signal of the first computing circuit 142. In addition, in this embodiment, an assumption can also be made that an anti-aliasing filter is applied to the optical sensor 10 before sampling is performed, but the present disclosure is not limited thereto.

The sequence generator 12 generates a periodic first reference sequence $A_0$ and a periodic second reference sequence $A_1$ according to the flicker frequency $F_{bin}$ and the sampling frequency $F_s$ that are to be detected, and the second reference sequence $A_1$ is a sequence delayed by ¼ of a period from the first reference sequence $A_0$. Theoretically, the first reference sequence $A_0$ can be a cosine function sequence, and the second reference sequence $A_1$ is relatively a sine function sequence, so that the second reference sequence $A_1$ is ¼ of a period delayed relative to the first reference sequence $A_0$. In other words, the second reference sequence $A_1$ has a phase offset of 90 degrees relative to the first reference sequence $A_0$, but the present disclosure is not limited thereto. For example, the second reference sequence $A_1$ can also be the sequence delayed by ⅓, ½, ⅔, or ¾ of the period from the first reference $A_0$.

In addition, both the first reference sequence $A_0$ and the second reference sequence $A_1$ only contain 1, 0, and −1, and respective indexes of the digital sequence X, the first reference sequence $A_0$, and the second reference sequence $A_1$ are numbered starting from 0, such that the system for detecting the flicker frequency has a low requirement of memory and a low computing complexity. Therefore, respective functions of the first reference sequence $A_0$ and the second reference sequence $A_1$ generated by the sequence generator 12 are:

$$A_0(n) = \begin{cases} 1, & \cos\left(2\pi\frac{F_{bin}}{F_s}n\right) \geq \frac{1}{3} \\ 0, & \frac{1}{3} \geq \cos\left(2\pi\frac{F_{bin}}{F_s}n\right) \geq -\frac{1}{3} \\ -1, & \cos\left(2\pi\frac{F_{bin}}{F_s}n\right) \leq -\frac{1}{3} \end{cases} ;$$

and $$A_1(n) = \begin{cases} 1, & \sin\left(2\pi\frac{F_{bin}}{F_s}n\right) \geq \frac{1}{3} \\ 0, & \frac{1}{3} \geq \sin\left(2\pi\frac{F_{bin}}{F_s}n\right) \geq -\frac{1}{3} \\ -1, & \sin\left(2\pi\frac{F_{bin}}{F_s}n\right) \leq -\frac{1}{3} \end{cases} .$$

It should be noted that $A_0$ (n) is an element having index n in the first reference sequence $A_0$, and $A_1$ (n) is an element having index n in the second reference sequence $A_1$. For example, referring to FIG. 2, FIG. 2 is a schematic view showing the first reference sequence $A_0$ and the second reference sequence $A_1$ generated when the sampling frequency $F_s$ is 2000 Hz and the flicker frequency $F_{bin}$ to be detected is 100 Hz according to one embodiment of the present disclosure.

Figure 2:
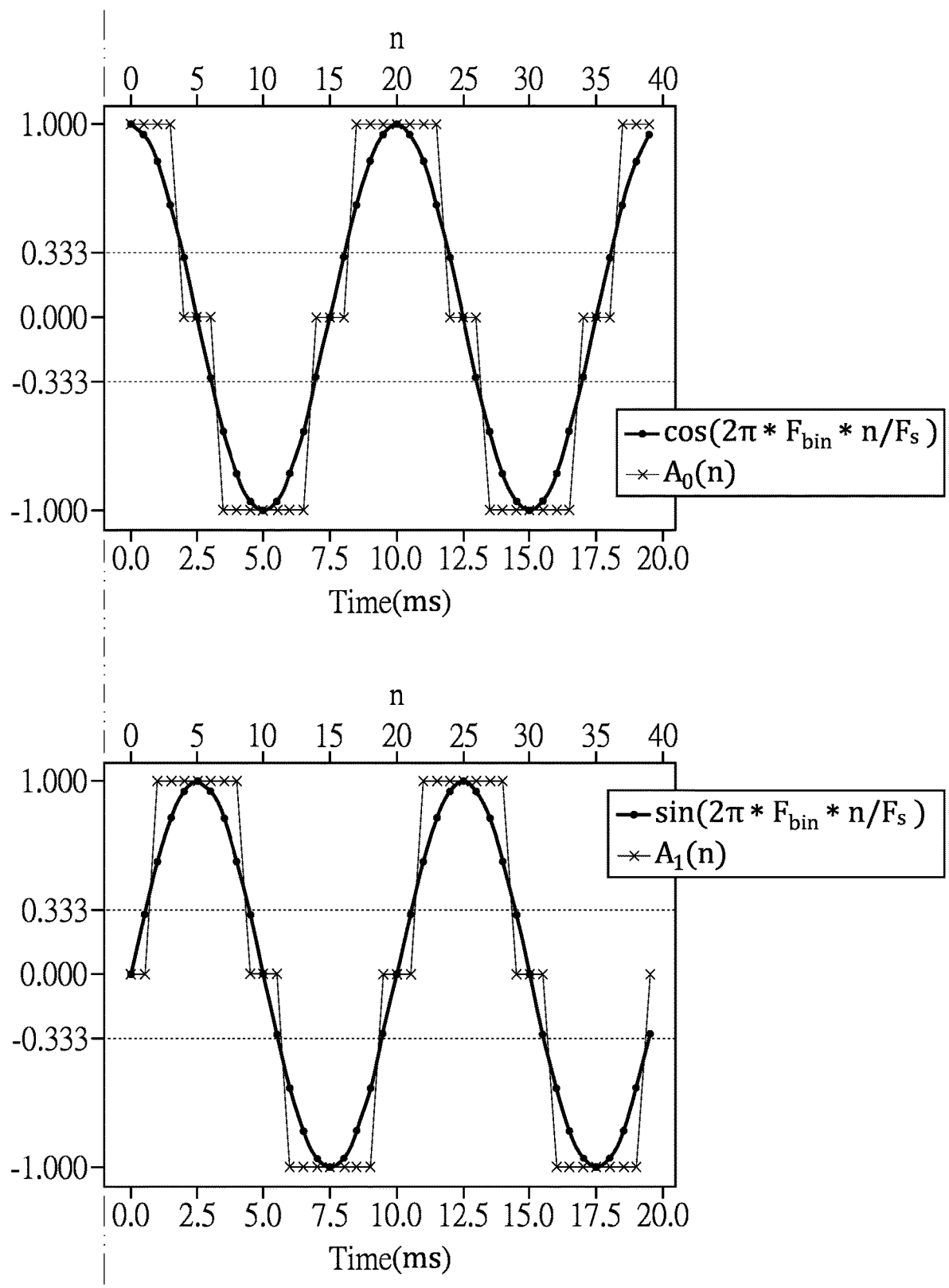
FIG. 2 is a schematic view showing a first reference sequence and a second reference sequence generated when a sampling frequency is 2000 Hz and a flicker frequency to be detected is 100 Hz according to one embodiment of the present disclosure.

As shown in FIG. 2, when the sampling frequency $F_s$ is 2000 Hz and the flicker frequency $F_{bin}$ is 100 Hz, the sequence generator 12 can obtain, from the above-mentioned functions, that elements having indexes from 0 to 19 in the first reference sequence $A_0$ are 1, 1, 1, 1, 0, 0, 0, −1, −1, −1, −1, −1, −1, 0, 0, 0, 1, 1, and 1; similarly, elements having indexes from 20 to 39 in the first reference sequence $A_0$ are repeated as 1, 1, 1, 1, 0, 0, 0, −1, −1, −1, −1, −1, −1, 0, 0, 0, 1, 1 and 1.

Similarly, when the sampling frequency $F_s$ is 2000 Hz and the flicker frequency $F_{bin}$ is 100 Hz, the sequence generator 12 can obtain, from the above-mentioned functions, that the elements having indexes from 0 to 19 in the second reference sequence $A_1$ are 0, 0, 1, 1, 1, 1, 1, 1, 1, 0, 0, 0, −1, −1, −1, −1, −1, −1, −1, and 0; similarly, the elements having indexes from 20 to 39 in the second reference sequence $A_0$ are repeated as 0, 0, 1, 1, 1, 1, 1, 1, 1, 0, 0, 0, −1, −1, −1, −1, −1, −1, −1, and 0. In other words, the first reference sequence $A_0$ and the second reference sequence $A_1$ in FIG. 2 are both periodic function sequences having elements that can be repeated after a period of 10 milliseconds (ms). This also indicates that the respective frequencies of the first reference sequence $A_0$ and the second reference sequence $A_1$ are set to be 100 Hz, which is the flicker frequency $F_{bin}$ to be detected by the system 1. Therefore, when the system 1 is changed to detect the flicker frequency $F_{bin}$ of 200 Hz, the sequence generator 12 changes the frequencies of the first reference sequence $A_0$ and the second reference sequence $A_1$ to 200 Hz, so that the first reference sequence $A_0$ and the second reference sequence $A_1$ are both periodic function sequences having elements that can be repeated after a period of 20 ms.

Next, the first computing circuit 142 is coupled to the optical sensor 10 and the sequence generator 12 so as to compute a first correlation coefficient $R_{real}$ between the digital sequence X and the first reference sequence $A_0$ and compute a second correlation coefficient $R_{img}$ between the digital sequence X and the second reference sequence $A_1$. As mentioned above, since both the first reference sequence $A_0$ and the second reference sequence $A_1$ only contain 1, 0, and −1, the complexity of computing of the system 1 provided in this embodiment is relatively low, such that computing the first correlation coefficient $R_{real}$ and the second correlation coefficient $R_{img}$ is very easy to be implemented in integrated circuits. Since only three unique values, i.e., 1, 0, and −1, are in the first reference sequence $A_0$ and the second reference sequence $A_1$, in this embodiment, only a 2-bit storage is required for the system 1 to store the values in the integrated circuits, that is, the embodiment has a low requirement of memory. Respective functions of the first correlation coefficient $R_{real}$ and the second correlation coefficient $R_{img}$ computed by the first computing circuit 142 are:

$$R_{real} = \frac{1}{N} \cdot \sum_{n=0}^{N-1} X(n) \cdot A_0(n);$$

and $$R_{img} = \frac{1}{N} \cdot \sum_{n=0}^{N-1} X(n) \cdot A_1(n).$$

Therefore, X(n) is the element with index n in the digital sequence X, and N is a total quantity of elements in the digital sequence X. Afterwards, the second computing circuit 144 is coupled to the first computing circuit 142, and computes a combined correlation coefficient according to the first correlation coefficient $R_{real}$ and the second correlation coefficient $R_{img}$, and computes the detection score $S_{core}$ that indicates a probability of existence of the flicker frequency $F_{bin}$, according to the combined correlation coefficient $R_{corr}$. In this embodiment, a function of the combined correlation coefficient computed by the second computing circuit 144 is:

$$R_{corr} = \sqrt{(R_{real})^2 + (R_{img})^2}.$$

In other words, when the flicker frequency $F_{bin}$ is detected only by a correlation between the digital sequence X and the first reference sequence $A_0$, the flicker frequency $F_{bin}$ may be missed. The present disclosure provides the second reference sequence $A_1$ that is ¼ of a period delayed relative to the first reference sequence $A_0$, and the correlation between the digital sequence X and each of the reference sequences are comprehensively managed. A function of the detection score $S_{core}$ computed by the second computing circuit 144 is:

$$S_{core} = \frac{R_{corr}}{X_{range}}.$$

It should be noted that X_range is a difference between a largest element and a smallest element in the digital sequence X. That is, X_range is a value obtained by subtracting the smallest element from the largest element, and is also known as a range. Therefore, the second computing circuit 144 can obtain the detection score $S_{core}$ from the above-mentioned functions to indicate the probability of existence of the flicker frequency $F_{bin}$. The higher the detection score $S_{core}$ is, the higher the probability of existence of the flicker frequency $F_{bin}$ becomes. In addition, in theory, most probability values are between 0 and 1. Therefore, in order to effectively maintain the detection score $S_{core}$ between 0 and 1, a function of the detection score $S_{core}$ computed by the second computing circuit 144 can also be:

$$S_{core} = \frac{R_{corr}}{1.21 \cdot 0.25 \cdot X_{range}}.$$

Therefore, the 1.21 and 0.25 in the above-mentioned function are only used to enable the detection score $S_{core}$ to be between 0 and 1, but the present disclosure is not limited thereto. In addition, for ease of an observation of a detection result, the system 1 for detecting the flicker frequency $F_{bin}$ can further include a determining circuit 16 that is coupled to the second computing circuit 144 for determining whether or not the detection score $S_{core}$ is greater than a threshold value TH, so as to determine whether or not the flicker frequency $F_{bin}$ is detected. When the detection score $S_{core}$ is not greater than the threshold value TH, the determining circuit 16 determines that the flicker frequency $F_{bin}$ is not detected, and when the detection score $S_{core}$ is greater than the threshold value TH, the determining circuit 16 determines that the flicker frequency $F_{bin}$ is detected.

In this embodiment, the determining circuit 16 can be implemented through a comparator, and a non-inverting input terminal and an inverting input terminal of the comparator respectively receive the detection score $S_{core}$ and the threshold value TH. Therefore, when the detection score $S_{core}$ is not greater than the threshold value TH, the comparator outputs 0 to indicate that the flicker frequency $F_{bin}$ is not detected, and when the detection score $S_{core}$ is greater than the threshold value TH, the comparator outputs 1 to indicate that the flicker frequency $F_{bin}$ is detected, but the present disclosure is not limited to the specific implementation of the determining circuit 16. The present disclosure is also not limited to the specific value of the threshold value TH. A user of the system 1 can set and then input the threshold TH to the determining circuit 16 according to actual needs or applications. In other words, the system 1 can set the threshold value TH by the user to determine whether or not the flicker frequency $F_{bin}$ is detected. Therefore, the system 1 can also be adjusted between detection sensitivity and detection accuracy by setting the threshold value TH by the user.

As mentioned above, since the system 1 can be applied to any electronic device, the system 1 provided by this embodiment can also be included in an electronic device 2, and the electronic device 2 is, for example, a smart phone or a camera that simply provides camera/photography functions. In general, the present disclosure is not limited to a specific implementation of the electronic device 2. However, in order to capture images or videos, the electronic device 2 must include a camera module 20 in addition to the system 1. Since the operating principle of the camera module 20 to capture images or videos are already known to people having ordinary skill in the art, the details thereof will not be reiterated herein. It should be noted that the camera module 20 can be coupled to the determining circuit 16 of the system 1 and receive the result of determining whether or not the flicker frequency $F_{bin}$ is detected by the determining circuit 16, so that the camera module 20 can automatically adjust an exposure time or an integration time. For example, after the system 1 determines that the flicker frequency $F_{bin}$ of 100 Hz is detected, the camera module 20 can adjust the exposure time or the integration time to an integer multiple of 100 Hz (i.e., the flicker frequency $F_{bin}$) to minimize banding artifacts.

Figure 3:
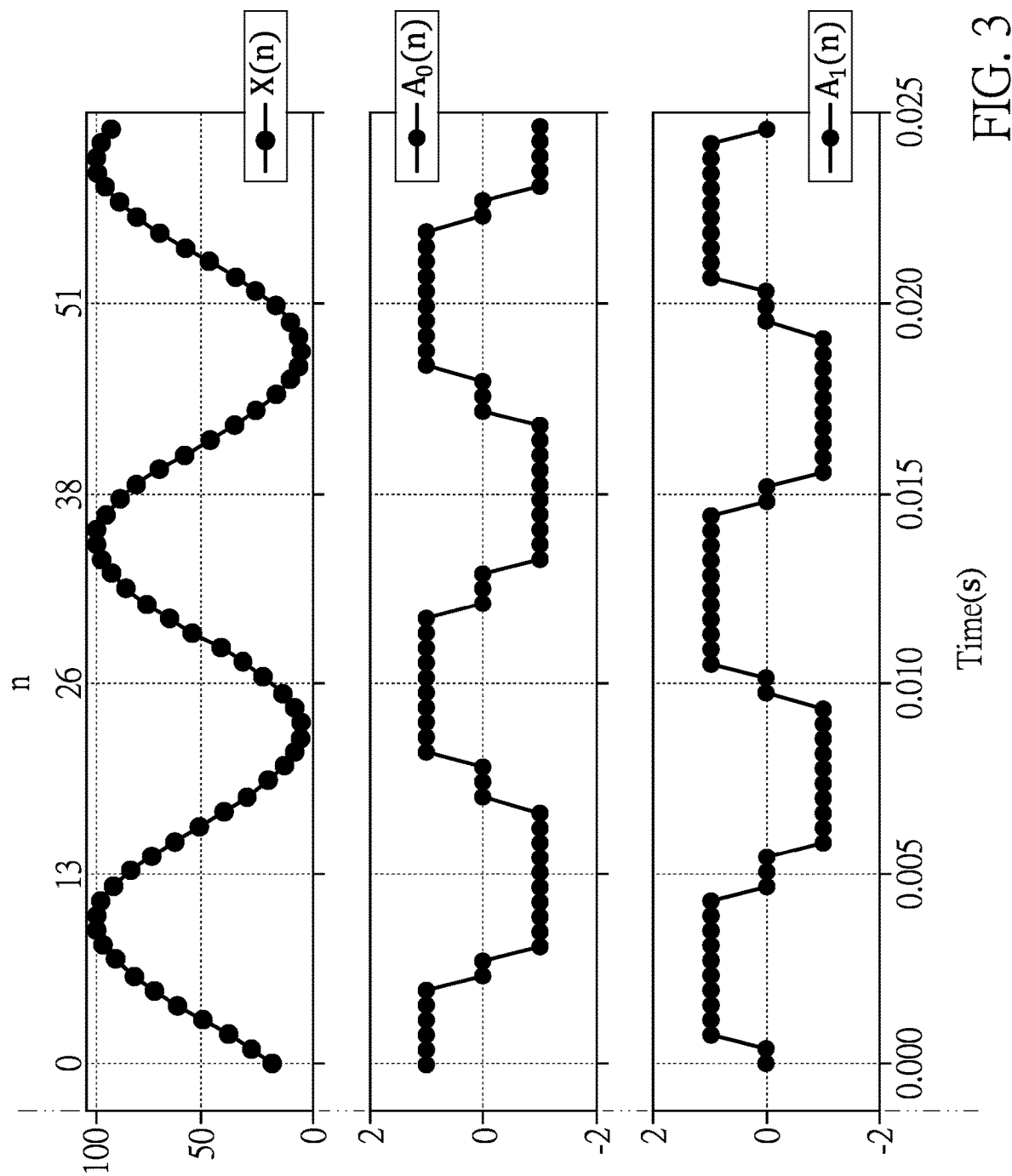
FIG. 3 is a schematic view showing a digital sequence, a first reference sequence, and a second reference sequence generated when a sampling frequency is 2560 Hz and a flicker frequency to be detected is 100 Hz according to a first embodiment of the present disclosure.
Figure 4:
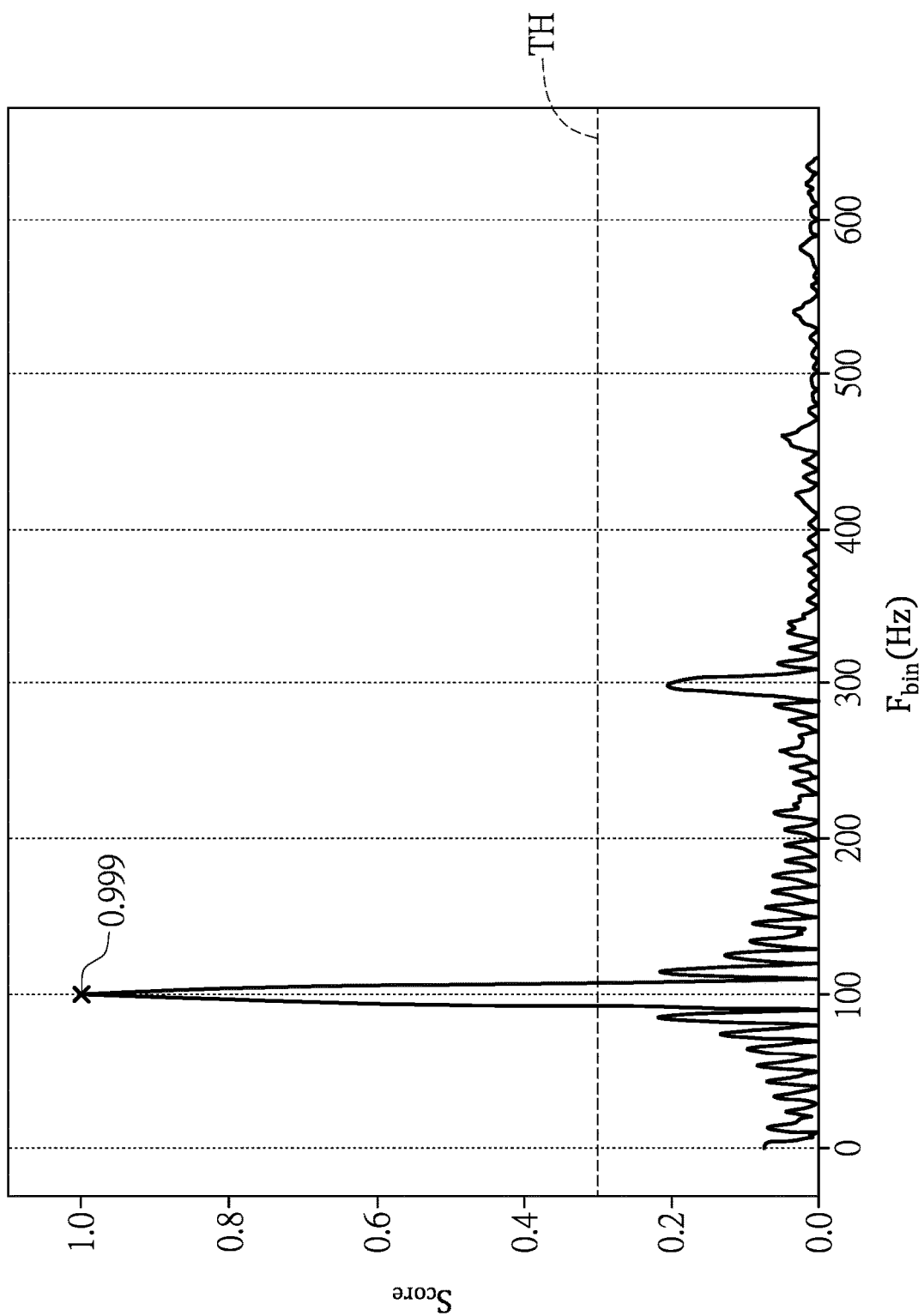
FIG. 4 is a schematic view showing a detection score computed by the digital sequence, the first reference sequence, and the second reference sequence as shown in FIG. 3.

Furthermore, references are made to FIG. 3 and FIG. 4. FIG. 3 is a schematic view showing the digital sequence X, the first reference sequence $A_0$, and the second reference sequence $A_1$ generated when the sampling frequency $F_s$ is 2560 Hz and the flicker frequency $F_{bin}$ to be detected is 100 Hz according to a first embodiment of the present disclosure. FIG. 4 is a schematic view showing the detection score $S_{core}$ computed by the digital sequence X, the first reference sequence $A_0$, and the second reference sequence $A_1$ as shown in FIG. 3. As shown in FIG. 3 and FIG. 4, assuming that the digital sequence X is an ideal single-tone signal without noise, when the environment has a flicker frequency of 100 Hz and the flicker frequency $F_{bin}$ to be detected by the system 1 is also 100 Hz, the system 1 can obtain that the detection score $S_{core}$ is 0.999 through the above-mentioned function. In addition, when the threshold value TH is set to be 0.3 at this time, the system 1 can determine that the flicker frequency $F_{bin}$ of 100 Hz is detected, given that the detection score $S_{core}$ is determined to be greater than the threshold value TH.

On the other hand, as shown in FIG. 4, when the environment only has a flicker frequency of 100 Hz, and the system 1 is changed to detect the flicker frequency $F_{bin}$ of 300 Hz, the sequence generator 12 of the system 1 generates a new first reference sequence $A_0$ and a new second reference sequence $A_1$ that are different from the first reference sequence $A_0$ and the second reference sequence $A_1$ as shown in FIG. 3, and the detection score $S_{core}$ obtained through the above-mentioned function is 0.2. In addition, when the threshold value TH is still set to be 0.3 at this time, the system 1 can determine that the flicker frequency $F_{bin}$ of 300 Hz is not detected, given that the detection score $S_{core}$ is determined to be not greater than the threshold value TH. Therefore, the system 1 of the present disclosure can be used to detect any flicker frequency $F_{bin}$ by generating an appropriate first reference sequence $A_0$ and an appropriate second reference sequence $A_1$. In other words, when the first reference sequence $A_0$ and the second reference sequence $A_1$ generated according to each different flicker frequencies $F_{bin}$ are inputted to the computing circuit 14, the system 1 can be used to detect each of the different flicker frequencies $F_{bin}$.

Figure 5:
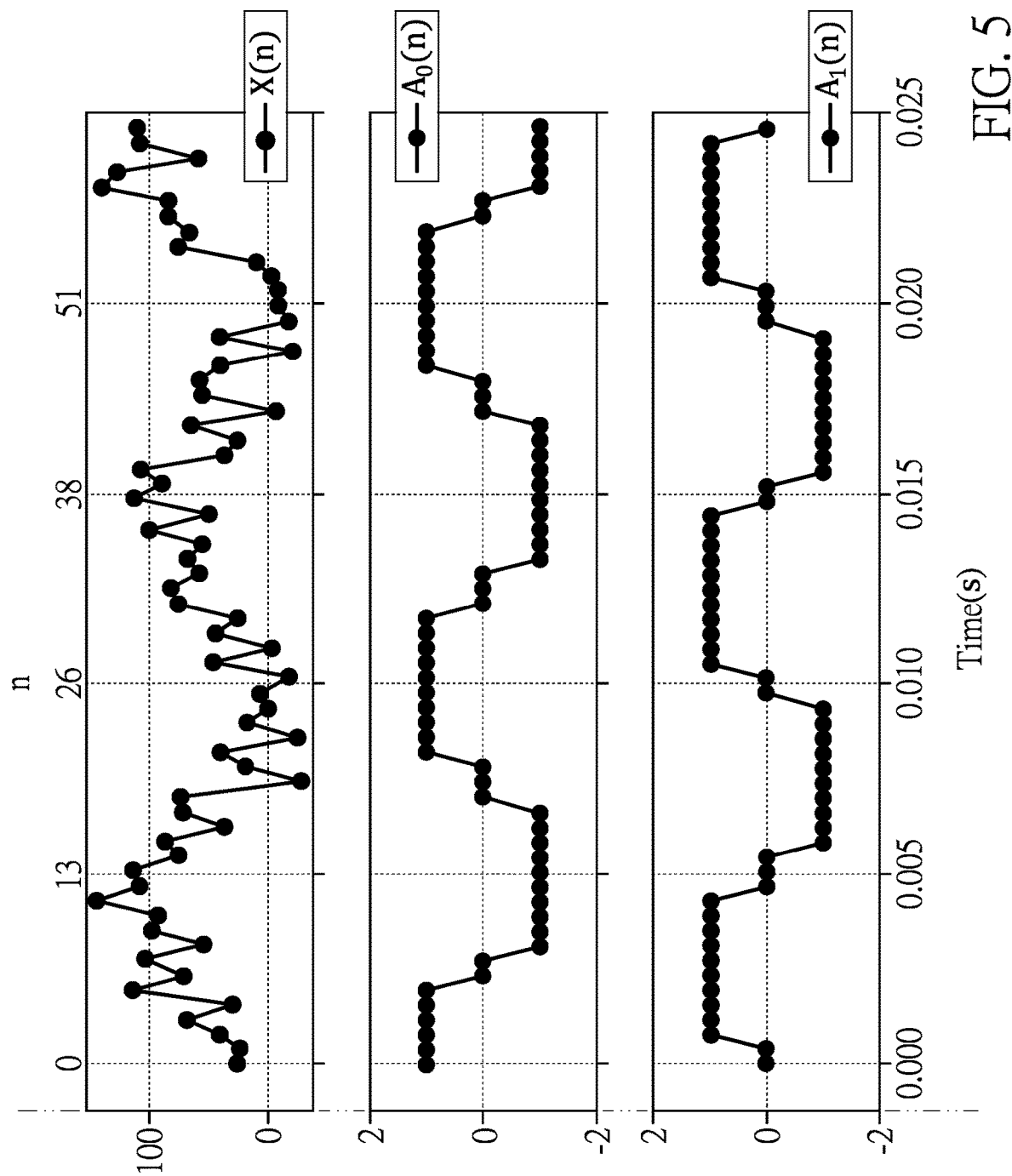
FIG. 5 is a schematic view showing a digital sequence, a first reference sequence, and a second reference sequence generated when a sampling frequency is 2560 Hz and a flicker frequency to be detected is 100 Hz according to a second embodiment of the present disclosure.
Figure 6:
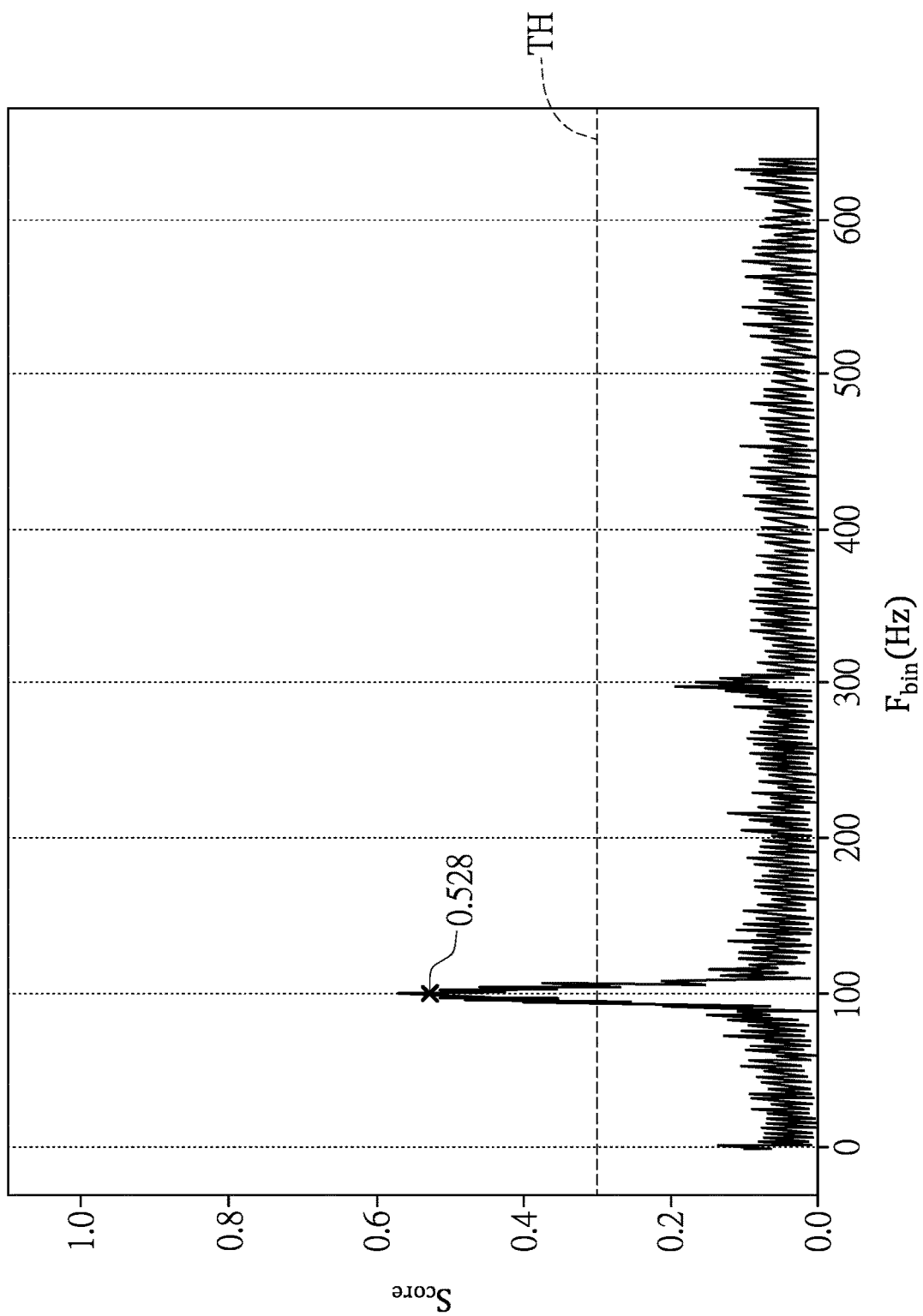
FIG. 6 is a schematic view showing a detection score computed by the digital sequence, the first reference sequence, and the second reference sequence shown in FIG. 5.

Similarly, references are made to FIG. 5 and FIG. 6. FIG. 5 is a schematic view showing the digital sequence X, the first reference sequence $A_0$, and the second reference sequence $A_1$ generated when the sampling frequency $F_s$ is 2560 Hz and the flicker frequency $F_{bin}$ to be detected is 100 Hz according to a second embodiment of the present disclosure. FIG. 6 is a schematic view showing the detection score $S_{core}$ computed by the digital sequence X, the first reference sequence $A_0$, and the second reference sequence $A_1$ shown in FIG. 5. As shown in FIG. 5 and FIG. 6, assuming that the digital sequence X is a single-tone signal with noise, when the environment has a flicker frequency of 100 Hz and the flicker frequency $F_{bin}$ to be detected by the system 1 is also 100 Hz, the system 1 can obtain that the detection score $S_{core}$ is 0.528 through the above-mentioned function. In addition, when the threshold value TH is still set to be 0.3 at this time, the system 1 can determine that the flicker frequency $F_{bin}$ of 100 Hz is detected, given that the detection score $S_{core}$ is determined to be greater than the threshold value TH.

Figure 7:
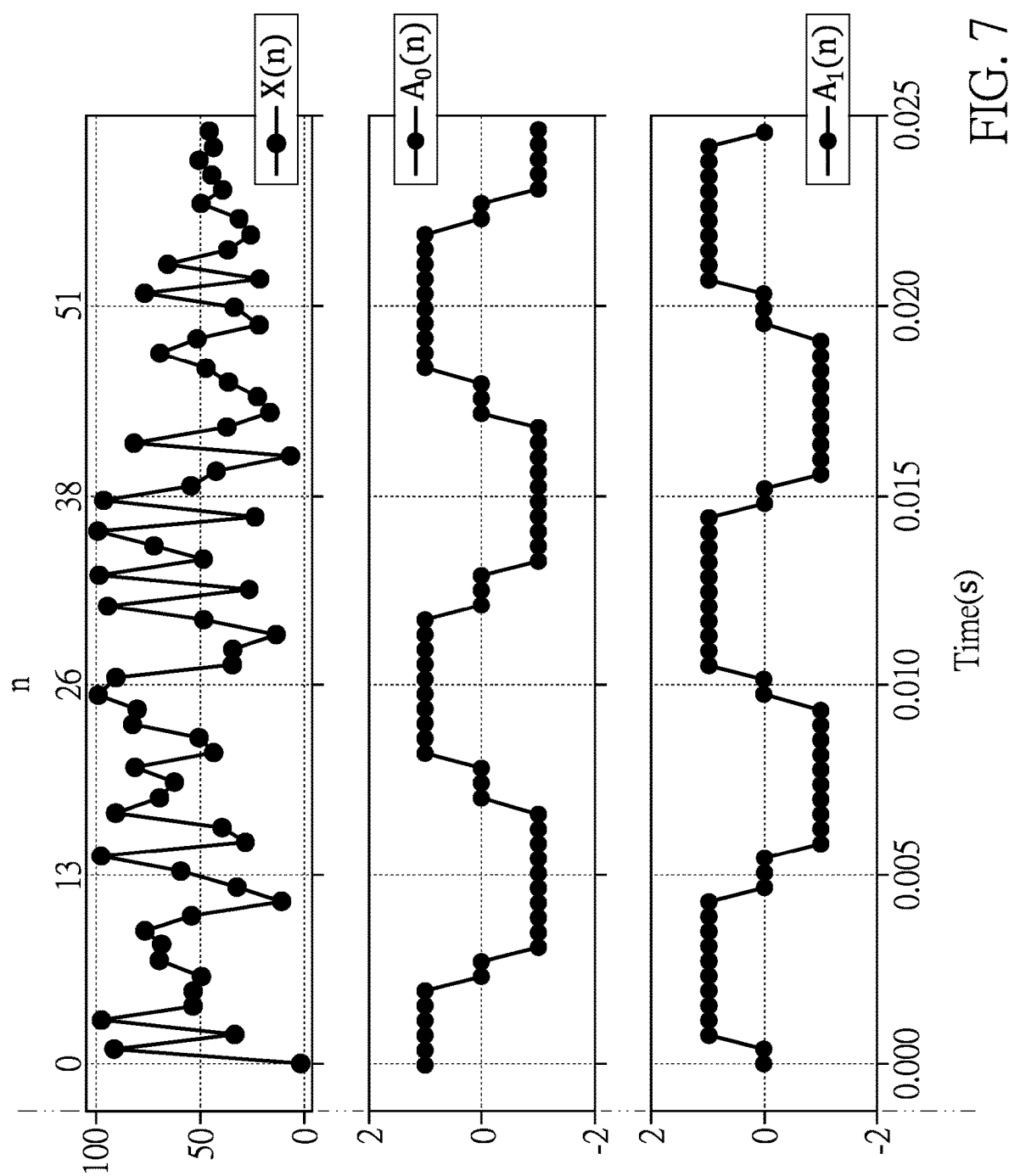
FIG. 7 is a schematic view showing a digital sequence, a first reference sequence, and a second reference sequence generated when a sampling frequency is 2560 Hz and a flicker frequency to be detected is 100 Hz according to a third embodiment of the present disclosure.
Figure 8:
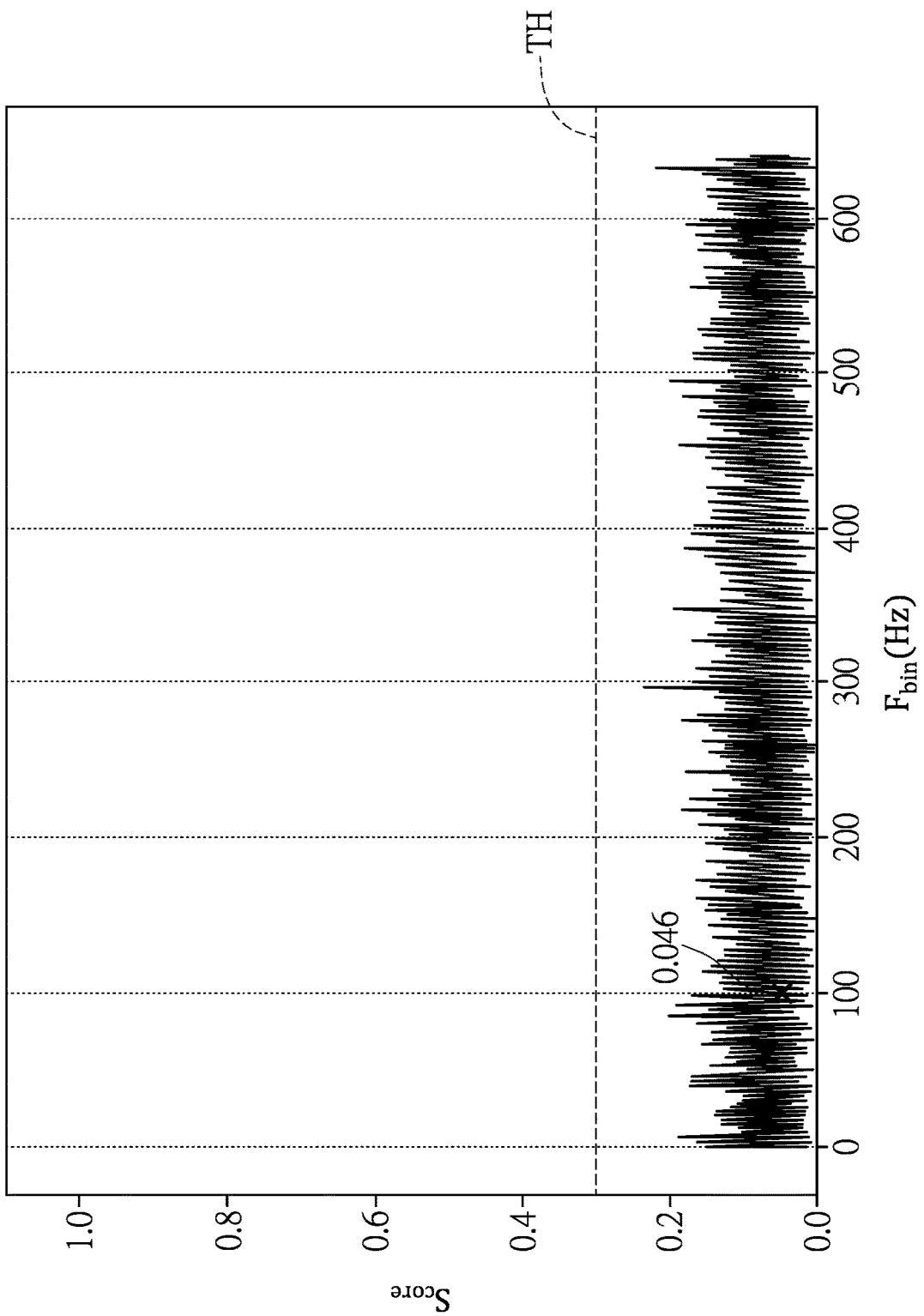
FIG. 8 is a schematic view showing a detection score computed by the digital sequence, the first reference sequence, and the second reference sequence shown in FIG. 7.
Figure 9:
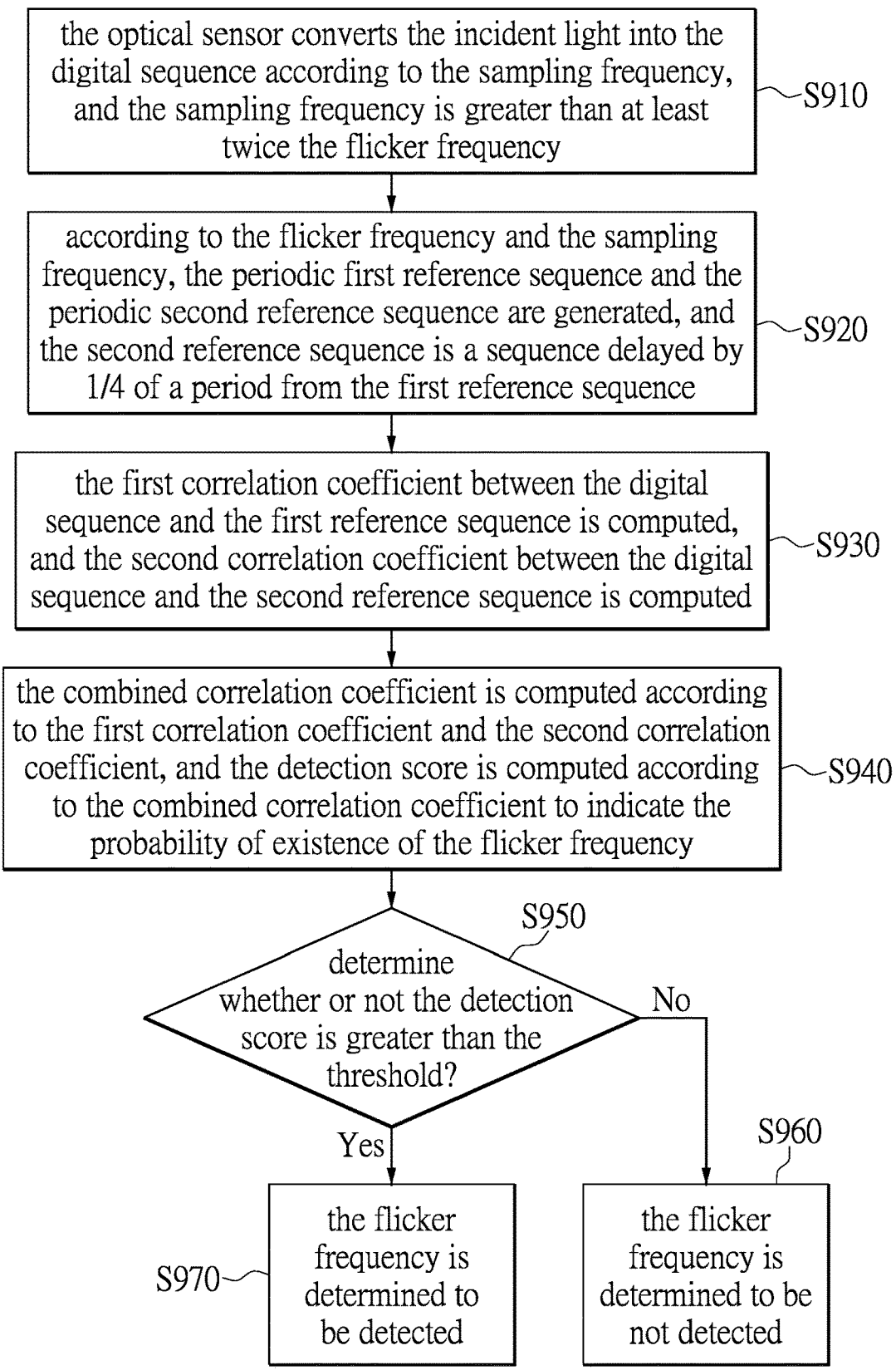
FIG. 9 is a flowchart showing steps of a method for detecting the flicker frequency according to one embodiment of the present disclosure.

Next, references are made to FIG. 7 and FIG. 8. FIG. 7 is a schematic view showing the digital sequence X, the first reference sequence $A_0$, and the second reference sequence $A_1$ generated when the sampling frequency $F_s$ is 2560 Hz and the flicker frequency $F_{bin}$ to be detected is 100 Hz according to a third embodiment of the present disclosure. FIG. 8 is a schematic view showing the detection score $S_{core}$ computed by the digital sequence X, the first reference sequence $A_0$, and the second reference sequence $A_1$ shown in FIG. 7. As shown in FIG. 7 and FIG. 8, assuming that the digital sequence X is a signal with some random noise, and the environment does not have a flicker frequency of 100 Hz and the flicker frequency $F_{bin}$ to be detected by system 1 is also 100 Hz, the system 1 can obtain that the detection score $S_{core}$ is 0.046 through the above-mentioned function. Since the threshold value TH is still set to 0.3 at this time, the system 1 can determine that the flicker frequency $F_{bin}$ of 100 Hz is not detected, given that the detection score $S_{core}$ is determined to be not greater than the threshold value TH. Finally, referring to FIG. 9, FIG. 9 is a flowchart showing steps of a method for detecting the flicker frequency $F_{bin}$ according to one embodiment of the present disclosure. Since the detailed steps and procedures are the same as those described in previous embodiments, they are only summarized and not reiterated herein.

As shown in FIG. 9, in step S910, the optical sensor 10 converts the incident light L into the digital sequence X according to the sampling frequency $F_s$, and the sampling frequency $F_s$ is greater than at least twice the flicker frequency $F_{bin}$. Secondly, in step S920, according to the flicker frequency $F_{bin}$ and the sampling frequency $F_s$, the periodic first reference sequence $A_0$ and the periodic second reference sequence $A_1$ are generated, and the second reference sequence $A_1$ is a sequence delayed by ¼ of a period from the first reference sequence $A_0$. Next, in step S930, the first correlation coefficient $R_{real}$ between the digital sequence X and the first reference sequence $A_0$ is computed, and the second correlation coefficient $R_{img}$ between the digital sequence X and the second reference sequence $A_1$ is computed. Afterwards, in step S940, the combined correlation coefficient is computed according to the first correlation coefficient $R_{real}$ and the second correlation coefficient $R_{img}$, and the detection score $S_{core}$ is computed according to the combined correlation coefficient $R_{corr}$ to indicate the probability of existence of the flicker frequency $F_{bin}$. As mentioned above, for ease of the observation of the detection result, the method in FIG. 7 may further include steps S950, S960, and S970. In step S950, whether or not the detection score $S_{core}$ is greater than the threshold value TH is determined. If not, step S960 is performed, and the flicker frequency $F_{bin}$ is determined to be not detected; if yes, step S970 is performed, and the flicker frequency $F_{bin}$ is determined to be detected.

BENEFICIAL EFFECTS OF THE EMBODIMENTS

In summary, the system and the method provided by the embodiments of the present disclosure can detect the flicker frequency with a lower requirement of memory, a lower computing complexity, and a higher detection accuracy, such that the system and the method can be effectively implemented in hardware and low energy consumption integrated circuits. For example, the lower requirement of memory can reduce the size and the cost of integrated circuits, and the low computing complexity can reduce power consumption and computational delay. In addition, the high detection accuracy enables the system and the method of the present disclosure to detect the flicker frequency even under the existence of noise, and the system and the method of the present disclosure can generate the appropriate first reference sequences and the appropriate second reference sequences. The sequences are used to detect any flicker frequencies, or when the first reference sequence and the second reference sequence generated according to each different flicker frequencies are inputted to the computing circuit, the system and the method can be used to detect different flicker frequencies.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A system for detecting a flicker frequency, comprising:
an optical sensor converting an incident light into a digital sequence according to a sampling frequency, the sampling frequency being greater than at least twice the flicker frequency;
a sequence generator generating a first reference sequence and a second reference sequence that are periodic according to the flicker frequency and the sampling frequency, the second reference sequence being a sequence delayed from the first reference sequence;
a first computing circuit coupled to the optical sensor and the sequence generator, the first computing circuit computing a first correlation coefficient between the digital sequence and the first reference sequence, and computing a second correlation coefficient between the digital sequence and the second reference sequence;
a second computing circuit coupled to the first computing circuit, the second computing circuit computing a detection score that indicates a probability of existence of the flicker frequency according to the first correlation coefficient and the second correlation coefficient; and
a determining circuit coupled to the second computing circuit, the determining circuit being used to determine whether or not the detection score is higher than a threshold value, so as to determine whether or not the flicker frequency is detected.

2. The system according to claim 1, wherein the second reference sequence being a sequence delayed by at least ¼ of period from the first reference sequence.

3. The system according to claim 2, wherein an index of the digital sequence, an index of the first reference sequence and an index of the second reference sequence are numbered starting with 0, and respective functions of the first reference sequence and the second reference sequence generated by the sequence generator are as follows:

$$A_0(n) = \begin{cases} 1, & \cos\left(2\pi\frac{F_{bin}}{F_s}n\right) \geq \frac{1}{3} \\ 0, & \frac{1}{3} \geq \cos\left(2\pi\frac{F_{bin}}{F_s}n\right) \geq -\frac{1}{3} \\ -1, & \cos\left(2\pi\frac{F_{bin}}{F_s}n\right) \leq -\frac{1}{3} \end{cases}$$

and $$A_1(n) = \begin{cases} 1, & \sin\left(2\pi\frac{F_{bin}}{F_s}n\right) \geq \frac{1}{3} \\ 0, & \frac{1}{3} \geq \sin\left(2\pi\frac{F_{bin}}{F_s}n\right) \geq -\frac{1}{3} \\ -1, & \sin\left(2\pi\frac{F_{bin}}{F_s}n\right) \leq -\frac{1}{3} \end{cases}$$

wherein $A_0(n)$ is an element having an index n in the first reference sequence, $A_1(n)$ is an element having an index n in the second reference sequence, $F_{bin}$ is the flicker frequency, and $F_s$ is the sampling frequency.

4. The system according to claim 3, wherein respective functions of the first correlation coefficient, the second correlation coefficient, and the combination correlation coefficient that are computed by the first computing circuit and the second computing circuit are as follows:

$$R_{real} = \frac{1}{N} \cdot \sum_{n=0}^{N-1} X(n) \cdot A_0(n);$$

$$R_{img} = \frac{1}{N} \cdot \sum_{n=0}^{N-1} X(n) \cdot A_1(n);$$

and $$R_{corr} = \sqrt{(R_{real})^2 + (R_{img})^2};$$

wherein $R_{real}$ is the first correlation coefficient, $R_{img}$ is the second correlation coefficient, $X(n)$ is an element having an index n in the digital sequence, and N is a total quantity of elements in the digital sequence.

5. The system according to claim 4, wherein the detection score is indicated as $S_{core}$, and, computed by the second computing circuit, a function of the detection score is as follows:

$$S_{core} = \frac{R_{corr}}{X_{range}};$$

wherein $X_{range}$ is a difference between a largest element and a smallest element of the digital sequence.

6. An electronic device comprising:
an optical sensor converting an incident light into a digital sequence according to a sampling frequency, the sampling frequency being greater than at least twice the flicker frequency;

a sequence generator generating a first reference sequence and a second reference sequence that are periodic according to the flicker frequency and the sampling frequency, the second reference sequence being a sequence delayed from the first reference sequence;

a first computing circuit coupled to the optical sensor and the sequence generator, the first computing circuit computing a first correlation coefficient between the digital sequence and the first reference sequence, and computing a second correlation coefficient between the digital sequence and the second reference sequence;

a second computing circuit coupled to the first computing circuit, the second computing circuit computing a detection score that indicates a probability of existence of the flicker frequency according to the first correlation coefficient and the second correlation coefficient;

a determining circuit coupled to the second computing circuit, the determining circuit being used to determine whether or not the detection score is higher than a threshold value, so as to determine whether or not the flicker frequency is detected; and a regulating circuit adjusting an exposure time or an integration time to an integer multiple of the flicker frequency.

7. The electronic device according to claim 6, wherein the second reference sequence being a sequence delayed by at least ¼ of period from the first reference sequence.

8. The electronic device according to claim 7 wherein an index of the digital sequence, an index of the first reference sequence and an index of the second reference sequence are numbered starting with 0, and respective functions of the first reference sequence and the second reference sequence generated by the sequence generator are as follows:

$$A_0(n) = \begin{cases} 1, & \cos\left(2\pi\frac{F_{bin}}{F_s}n\right) \geq \frac{1}{3} \\ 0, & \frac{1}{3} \geq \cos\left(2\pi\frac{F_{bin}}{F_s}n\right) \geq -\frac{1}{3} \\ -1, & \cos\left(2\pi\frac{F_{bin}}{F_s}n\right) \leq -\frac{1}{3} \end{cases};$$

and $$A_1(n) = \begin{cases} 1, & \sin\left(2\pi\frac{F_{bin}}{F_s}n\right) \geq \frac{1}{3} \\ 0, & \frac{1}{3} \geq \sin\left(2\pi\frac{F_{bin}}{F_s}n\right) \geq -\frac{1}{3} \\ -1, & \sin\left(2\pi\frac{F_{bin}}{F_s}n\right) \leq -\frac{1}{3} \end{cases};$$

wherein $A_0(n)$ is an element having an index n in the first reference sequence, $A_1(n)$ is an element having an index n in the second reference sequence, $F_{bin}$ is the flicker frequency, and $F_s$ is the sampling frequency.

9. The electronic device according to claim 8, wherein respective functions of the first correlation coefficient, the second correlation coefficient, and the combination correlation coefficient that are computed by the first computing circuit and the second computing circuit are as follows:

$$R_{real} = \frac{1}{N} \cdot \sum_{n=0}^{N-1} X(n) \cdot A_0(n);$$

$$R_{img} = \frac{1}{N} \cdot \sum_{n=0}^{N-1} X(n) \cdot A_1(n);$$

and $$R_{corr} = \sqrt{(R_{real})^2 + (R_{img})^2};$$

wherein $R_{real}$ is the first correlation coefficient, $R_{img}$ is the second correlation coefficient, $X(n)$ is an element having an index n in the digital sequence, and N is a total quantity of elements in the digital sequence.

10. The electronic device according to claim 9, wherein the detection score is indicated as $S_{core}$, and, computed by the second computing circuit, a function of the detection score is as follows:

$$S_{core} = \frac{R_{corr}}{X_{range}};$$

wherein $X_{range}$ is a difference between a largest element and a smallest element of the digital sequence.

11. The electronic device according to claim 6, wherein the electronic device can be a camera or a smart phone.

12. A method for detecting a flicker frequency, comprising:

utilizing an optical sensor to convert an incident light into a digital sequence according to a sampling frequency, the sampling frequency being greater than at least twice the flicker frequency;

generating a first reference sequence and a second reference sequence that are periodic according to the flicker frequency and the sampling frequency, the second reference sequence being a sequence delayed by a period from the first reference sequence;

computing a first correlation coefficient between the digital sequence and the first reference sequence, and computing a second correlation coefficient between the digital sequence and the second reference sequence;

computing a detection score that indicates a probability of existence of the flicker frequency according to the first correlation coefficient and the second correlation coefficient; and determining whether or not the detection score is higher than a threshold value, so as to determine whether or not the flicker frequency is detected;

wherein, when the detection score is not higher than the threshold value, the flicker frequency is determined to be undetected, and when the detection score is higher than the threshold value, the flicker frequency is determined to be detected.

13. The method according to claim 12, wherein the second reference sequence is the sequence delayed by at least ¼ of period from the first reference sequence.

14. The method according to claim 13, wherein an index of the digital sequence, an index of the first reference sequence and an index of the second reference sequence are numbered starting with 0, and a function for generating the first reference sequence and a function for generating the second reference sequence are as follows:

$$A_0(n) = \begin{cases} 1, & \cos\left(2\pi \frac{F_{bin}}{F_s} n\right) \geq \frac{1}{3} \\ 0, & \frac{1}{3} \geq \cos\left(2\pi \frac{F_{bin}}{F_s} n\right) \geq -\frac{1}{3} \\ -1, & \cos\left(2\pi \frac{F_{bin}}{F_s} n\right) \leq -\frac{1}{3} \end{cases} ;$$

and $$A_1(n) = \begin{cases} 1, & \sin\left(2\pi \frac{F_{bin}}{F_s} n\right) \geq \frac{1}{3} \\ 0, & \frac{1}{3} \geq \sin\left(2\pi \frac{F_{bin}}{F_s} n\right) \geq -\frac{1}{3} \\ -1, & \sin\left(2\pi \frac{F_{bin}}{F_s} n\right) \leq -\frac{1}{3} \end{cases} ;$$

wherein $A_0(n)$ is an element having an index n in the first reference sequence, $A_1(n)$ is an element having an index n in the second reference sequence, $F_{bin}$ is the flicker frequency, and $F_s$ is the sampling frequency.

15. The method according to claim 14, wherein a function for computing the first correlation coefficient, a function for computing the second correlation coefficient, and a function of the combination correlation coefficient are as follows:

$$R_{real} = \frac{1}{N} \cdot \sum_{n=0}^{N-1} X(n) \cdot A_0(n);$$

$$R_{img} = \frac{1}{N} \cdot \sum_{n=0}^{N-1} X(n) \cdot A_1(n);$$

and $$R_{corr} = \sqrt{(R_{real})^2 + (R_{img})^2} ;$$

wherein $R_{real}$ is the first correlation coefficient, $R_{img}$ is the second correlation coefficient, $X(n)$ is an element having an index n in the digital sequence, and N is a total quantity of elements in the digital sequence.

16. The method according to claim 15, wherein the detection score is indicated as $S_{core}$, and a function for computing the detection score is as follows:

$$S_{core} = \frac{R_{corr}}{X_{range}};$$

wherein $X_{range}$ is a difference between a largest element and a smallest element of the digital sequence.

\* \* \* \* \*